United States Patent
Luo et al.

(10) Patent No.: US 9,922,009 B2
(45) Date of Patent: Mar. 20, 2018

(54) NETWORK MEDIA INFORMATION DISPLAY SYSTEM, METHOD, APPARATUS AND SERVER

(71) Applicant: TENCENT TECHNOLOGY (SHENZHEN) COMPANY LIMITED, Shenzhen (CN)

(72) Inventors: Ming Luo, Shenzen (CN); Pingfeng Cheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 169 days.

(21) Appl. No.: 14/650,884

(22) PCT Filed: Dec. 23, 2013

(86) PCT No.: PCT/CN2013/090187
§ 371 (c)(1),
(2) Date: Jun. 10, 2015

(87) PCT Pub. No.: WO2014/101724
PCT Pub. Date: Jul. 3, 2014

(65) Prior Publication Data
US 2017/0031875 A1    Feb. 2, 2017

(30) Foreign Application Priority Data
Dec. 24, 2012  (CN) .......................... 2012 1 0564384

(51) Int. Cl.
*G06F 17/22* (2006.01)
*H04L 29/08* (2006.01)
(Continued)

(52) U.S. Cl.
CPC ........ *G06F 17/2247* (2013.01); *G06F 17/248* (2013.01); *G06F 17/2705* (2013.01);
(Continued)

(58) Field of Classification Search
CPC ........................... G06F 17/248; G06F 17/3089
See application file for complete search history.

(56) References Cited

U.S. PATENT DOCUMENTS

2007/0206221 A1* 9/2007 Wyler .................... H04L 67/42
358/1.15
2008/0065634 A1   3/2008 Krinsky
(Continued)

FOREIGN PATENT DOCUMENTS

CN      101599015 A     12/2009
CN      101706821 A     5/2010
(Continued)

OTHER PUBLICATIONS

Search Report in International Application No. PCT/CN2013/090187 dated Mar. 20, 2014.
(Continued)

*Primary Examiner* — Andrew T McIntosh
(74) *Attorney, Agent, or Firm* — Marshall, Gerstein & Borun LLP (57) ABSTRACT

The present application discloses a network media information display system, method, apparatus and server. The method includes: setting network media information data in a display server, the network media information data including a model type corresponding to a network media information template, template data, and element content, and the template data including an element identification and model data; setting the model type and a creation script of a corresponding basic element in a display apparatus; acquiring, by the display apparatus, corresponding network media information from the display server, automatically creating a basic element corresponding to the model type of the network media information according to a preset basic element creation script, matching a structural element of the current network media information according to an element (Continued)

identification in the template data, and assembling, according to the model data, the structural element into the network media information that needs to be displayed.

8 Claims, 7 Drawing Sheets

(51) Int. Cl.
    *H04L 29/06*     (2006.01)
    *G06F 17/30*     (2006.01)
    *G06F 17/24*     (2006.01)
    *G06F 17/27*     (2006.01)
    *G06F 3/0484*     (2013.01)

(52) U.S. Cl.
    CPC .... G06F 17/3089 (2013.01); G06F 17/30864 (2013.01); H04L 65/602 (2013.01); H04L 65/604 (2013.01); H04L 67/02 (2013.01); H04L 67/36 (2013.01); *G06F 3/04842* (2013.01)

(56) References Cited

U.S. PATENT DOCUMENTS

2009/0063500 A1\*   3/2009   Zhai ................. G06F 17/30911
2011/0145735 A1\*   6/2011   Driesner ................ G06Q 10/06
                                                        715/762

FOREIGN PATENT DOCUMENTS

CN           102480514 A     5/2012
CN           102750148 A    10/2012

OTHER PUBLICATIONS

Search Report in EP Application No. 13869289.2 dated Jan. 7, 2016, 7 pages.
International Preliminary Report on Patentability and Written Opinion in International Application No. PCT/CN2013/090187 dated Jun. 30, 2015, 11 pages.
Office Action from Chinese Application No. 201210564384.0 dated Mar. 29, 2017.

\* cited by examiner

NETWORK MEDIA INFORMATION DISPLAY SYSTEM, METHOD, APPARATUS AND SERVER

FIELD OF THE TECHNOLOGY

The present disclosure relates to the field of data processing technologies of Internet, and in particular, to a network media information display method, a display system, a display apparatus, and a display server.

BACKGROUND OF THE DISCLOSURE

Network media information refers to various electronic information using a digital script as a carrier and published on various display media (such as a webpage and a client interface) of an Internet system, such as a network advertisement and other display information. The network media information includes an element of the network media information, that is, an information element. The information element is an element (such as a picture, a text, a button, and a link) forming the network media information and a presentation form (a presentation form such as a position, size and color of the element) of the element in the network media information. When the network media information is displayed, element content of the information element is further required, such as an address of a picture (a display apparatus may acquire a picture according to the address and display the picture), specific content of a text, a display content on a button, and a jump address corresponding to a link, and the element content are generally input by a releaser of the network media information when releasing the network media information.

Figure 1:
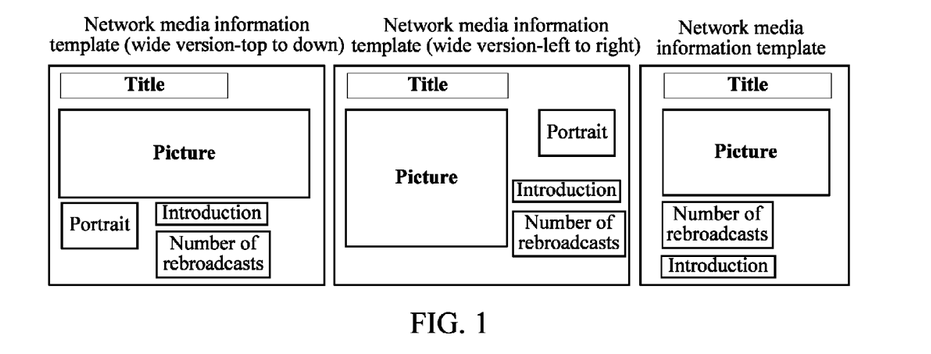
FIG. 1 is a schematic effect diagram of network media information displayed by three different network media information templates.

In a current network media information display system, various network media information templates may be set for being selected by the releaser. The network media information template is a model of displaying the network media information. FIG. 1 shows a schematic effect diagram of network media information displayed by three different network media information templates. The releaser may select, from various network media information templates, a network media information template with a satisfied model, and input element content corresponding to an information element in the network media information template, for example, if the information element in the network media information template includes a title text, a picture, and a picture jump link, the releaser needs to input content of the title text, an acquisition address of the picture, and a universal resource locator (URL) of the picture jump link, and a display system outputs and displays corresponding network media information according to form data of the network media information template and the element content.

However, in the prior art, each time when a developer compiles a network media information template for being selected by a releaser, the developer needs to compile creation scripts (the scripts are generally javascript scripts) of all information elements in the network media information template, and scripts for displaying the information elements according to a designated model. The script needs to be corresponding to product features of the network media information, needs to be conflict-free with other scripts, and also needs to be a cross-browser script having good compatibility. Therefore, in the prior art, the reusability of scripts is poor, the extensibility is poor, and the development efficiency is low.

SUMMARY

Accordingly, embodiments of the present invention provide a network media information display system, a display method, a display apparatus and a display server, so as to improve the reusability of scripts and improve the extensibility and the development efficiency.

The technical solutions of the embodiments of the present invention are implemented as follows:

A network media information display system, including a display server and a user display apparatus, where the display server is configured to set network media information data, the network media information data including a model type corresponding to a network media information template, template data, and element content, and the template data including an element identification and model data;

the user display apparatus includes a process control module, a basic module, a parsing module, a matching module, and an assembling module;

the process control module is configured to acquire the network media information data from the display server;

the basic module is configured to create a candidate basic element corresponding to the model type;

the parsing module is configured to parse the template data to obtain the element identification and the model data;

the matching module is configured to extract, from the candidate basic element, a basic element matching with the parsed element identification, use the extracted basic element as a structural element, and add the element content to the structural element; and the assembling module is configured to assemble the structural element into network media information according to the model data, and output and display the network media information.

A network media information displaying method, including:

acquiring, by a display apparatus, network media information data from a display server, the network media information data including a model type corresponding to a network media information template, template data, and element content, and the template data including an element identification and model data;

creating a basic element corresponding to the model type;

parsing the template data to obtain the element identification and the model data;

extracting, from the created basic element, a basic element matching with the parsed element identification, using the extracted basic element as a structural element, and adding the element content to the structural element; and assembling the structural element into network media information according to the model data, and outputting and displaying the network media information.

A network media information displaying method, including:

setting, by a display server, a model type and template data corresponding to a candidate network media information template;

displaying, by the display server, the candidate network media information template;

receiving, by the display server, a selection instruction and element content of a user, the selection instruction instructing the user to select a network media information template from the candidate network media information template; and generating, by the display server, network media information data and storing the network media information data, the network media information data including the model type and the template data corresponding to the network media information template selected by the user, and the element content input by the user.

A user display apparatus for network media information includes a process control module, a basic module, a parsing module, a matching module, and an assembling module, where the process control module is configured to acquire corresponding network media information data from a display server, the network media information data including a model type corresponding to a network media information template, template data, and element content, and the template data including an element identification and model data;

the basic module is configured to create a basic element corresponding to the model type;

the parsing module is configured to parse the template data to obtain the element identification and the model data;

the matching module is configured to extract, from the basic element created by the basic module, a basic element matching with the parsed element identification, use the extracted basic element as a structural element, and add the element content to the structural element; and the assembling module is configured to assemble the structural element into network media information according to the model data, and output and display the network media information.

A display server for network media information, including a first setting apparatus and a second setting apparatus, where the first setting apparatus is configured to set a model type and template data corresponding to a candidate network media information template; and the second setting apparatus is configured to display the candidate network media information template to a user for the user to select, receive a selection instruction of the user and element content input by the user, generate network media information data and store the network media information data, the selection instruction instructing the user to select a network media information template from the candidate network media information template, the network media information data including the model type and the template data corresponding to the network media information template, and the element content input by the user, and the template data including an element identification and model data.

In the embodiments of the present invention, the model type sets different template models, and in each model type, at least one specific network media information template may be set correspondingly; and a basic network media information element (briefly referred to as a basic element in this text) corresponding to each model type is preset. In the display server, a basic element identification corresponding to each model type needs to be set, and when a developer sets a random type of network media information template corresponding to a model type, the developer merely needs to select an element identification from the basic element corresponding to the model type and input model data, without the need of compiling a script of the selected element. In the display apparatus, an identification and a creation script of a basic element corresponding to each model type need to be set. After acquiring network media information data, the display apparatus may automatically create a basic element corresponding to the network media information model type according to a preset basic element creation script, find a structural element of the current network media information by matching according to an element identification in the template data, and then assemble, according to the model data, the structural element into network media information that needs to be displayed. Therefore, in the embodiments of the present invention, when developing a new network media information template, a developer of the network media information template does not need to frequently write and modify a large amount of scripts, and only needs to focus on writing of template data, without the need of concerning problems such as complicated network media information logic and script compatibility; therefore, the reusability of the script is high, and the extensibility of the network media information template is strong, so as to reduce development and maintenance costs of the network media information template, reduce the number of BUGs of the script, and improve the development efficiency. Moreover, the launching efficiency of the new network media information template may be improved, and it is unnecessary to publish a new network media information template script. On the other hand, it is conducive to unify standards for making network media information, and when there are many developers, the present disclosure may be conducive to interoperability between the developers, thereby reducing communication cost caused by inconsistent standards for making network media information.

DESCRIPTION OF EMBODIMENTS

The present disclosure is described in further details through specific embodiments with reference to the accompanying drawings.

Figure 2:
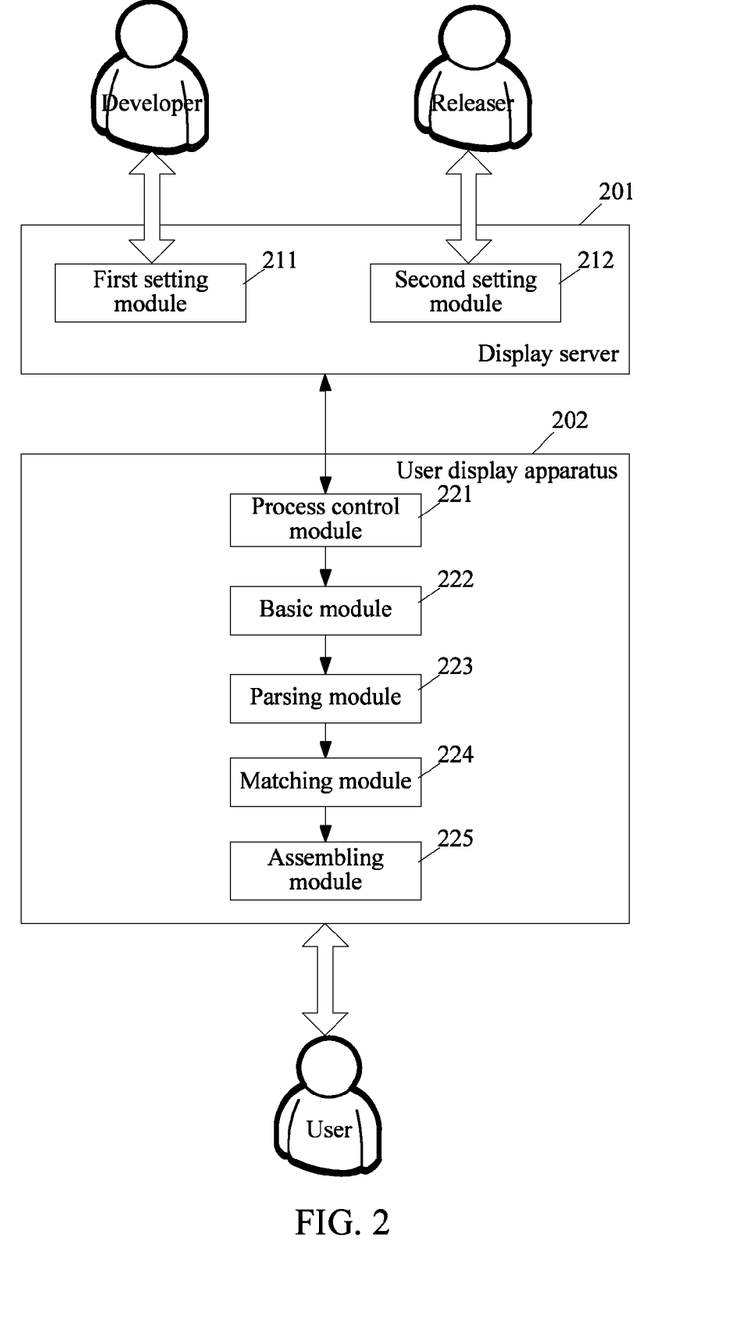
FIG. 2 is a schematic composition diagram of a network media information display system according to an embodiment of the present invention.

FIG. 2 is a schematic composition diagram of a network media information display system according to an embodiment of the present invention. Referring to FIG. 2, the display system includes: a display server 201 and a user display apparatus 202.

The display server 201 is configured to set network media information data, the network media information data including a model type corresponding to a network media information template, template data, and element content. The model type sets a template model. The template data includes an element identification and model data. The element identification is an identification of an element of network media information, such as a picture identification, a text identification, and a link identification, and the model data refers to data used for describing a position relationship (a relationship such as overlapping) between the network media information elements and other data for presenting the model.

In a specific implementation, the network media information data may further include accumulated display effect data. The accumulated display effect data may be the number of times of browsing network media information, the number of comments on network media information, and the like.

As shown in FIG. 2, the display server 201 specifically includes a first setting apparatus 211 and a second setting apparatus 212.

The first setting apparatus 211 is oriented to a developer and is used for being used by a developer, which is actually a setting interface provided for the developer, and is configured to set, in the display server 201, model types and template data corresponding to more than two network media information templates. The template data includes an element identification and model data. The model type sets the template model, for example, "sns_wide_pic_leftRight" indicates one model type, and represents a model type of "social network site-widescreen-having pictures-left-right structure". Each model type is corresponding to one or more preset basic network media information elements (briefly referred to as basic elements in this text). Each model type is further corresponding to one or more specific network media information templates. The network media information template corresponding to the model type includes all or a part of basic elements corresponding to the model type. In the display server 201, it is needed to set basic elements corresponding to each model type. A creation script required for creating basic elements has been set, when a developer sets, by using the first setting apparatus 211, a random type of network media information template corresponding to a model type, the developer merely needs to select an identification of a basic element from the basic elements corresponding to the model type and input model data, without the need of writing a script for creating the selected element, thereby greatly reducing the workload of the developer. In this case, for several developers, identifications of basic elements corresponding to each model type are unified, and a basic element identification corresponds to a unique creation script for creating the basic element, thereby avoiding script difference when different developers develop element scripts, and facilitating direct teamwork of the different developers.

Figure 3:
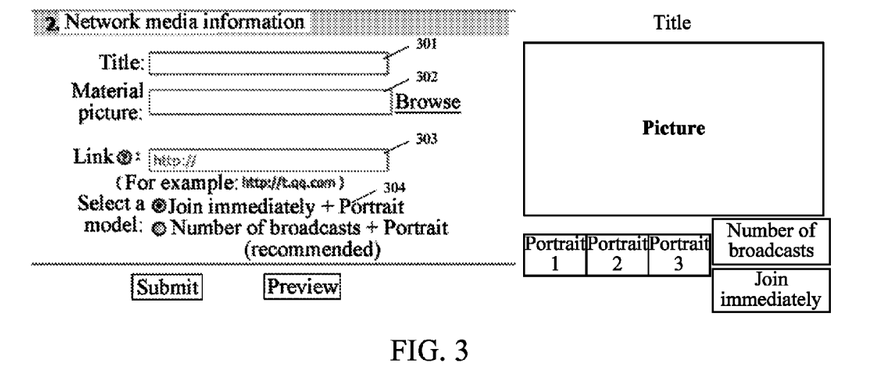
FIG. 3 is a schematic diagram of a content setting interface of a selected network media information template displayed to a releaser.

The second setting apparatus 212 is oriented to a releaser user of network media information, specifically may be a front-end webpage service apparatus or client set on a server, and the releaser may access, by using a browser, the second setting apparatus 212 to release network media information, or may also be a client. The second setting apparatus 212 is configured to display, to the releaser of network media information, the network media information templates (that is, candidate network media information templates) set by the developer in the first setting apparatus 211 for the releaser to select, and receive a selection instruction of the releaser and element content correspondingly input by the releaser, and generate corresponding network media information data and store the network media information data. The selection instruction indicates the network media information template selected from the candidate network media information templates. The network media information data includes a model type and template data corresponding to the network media information template selected by the releaser, and the element content input by the releaser. The template data includes an element identification and model data. The second setting apparatus 212 generally has a setting interface, for example, three candidate network media information templates as shown in FIG. 1 may be displayed for the releaser to select, the releaser may select one of the network media information templates, and then a content setting interface of the selected network media information template may be displayed to the releaser. FIG. 3 is a schematic diagram of the content setting interface of the selected network media information template displayed to the releaser. Referring to FIG. 3, assuming that the user selects the network media information template "big picture network media information (wide version-top-down)" in FIG. 1, it is necessary to prompt the user to input element content of basic elements included by the network media information template in FIG. 3, for example, a title text 301, a material picture 302, a network media information jump link 303, and a more detailed template model option 304. In a specific implementation, after the releaser inputs the element content and the selection instruction, the releaser may click a "submit" button to send a submit request, and when receiving the submit request, the second setting apparatus 212 may receive the selection instruction of the releaser and the element content correspondingly input by the releaser, and generate corresponding network media information data and store the network media information data.

In a specific implementation, if the network media information data further includes accumulated display effect data, the second setting apparatus 212 needs to initialize the accumulated display effect data. The generated network media information data includes the initialized accumulated display effect data.

The releaser may be a user releasing the network media information.

In a specific implementation, if the network media information data further includes the accumulated display effect data, the second setting apparatus 212 accumulates display effect data sent by one or more user display apparatuses with the accumulated display effect data to obtain new accumulated display effect data, and updates the accumulated display effect data to the new accumulated display effect data.

The user display apparatus 202 is an apparatus configured to directly perform man-machine interaction with the user, and specifically may be a front-end webpage service apparatus set on the server, the user may access the front-end webpage service apparatus through a browser to process and display network media information; or may also be a client. As shown in FIG. 2, the user display apparatus 202 includes a process control module 221, a basic module 222, a parsing module 223, a matching module 224, and an assembling module 225.

The process control module 221 is configured to start a control display process, and acquire corresponding network media information data from the display server 201. Specifically, when it is needed to display network media information, the display apparatus initiates a display request including a booth identification to the display server 201, the time that needs to display network media information is that the user opens a certain webpage or client interface including the booth identification, or the like; after receiving the display request, the display server 201 searches for network media information data corresponding to the booth identification, and returns the network media information data to the display apparatus. The display server 201 is corresponding to one booth identification after setting each piece of network media information data, used to indicate a position on a network at which the network media information data needs to be displayed, that is, a target booth at which the releaser expects the network media information data to be released.

As shown in FIG. 2, the display server 201 specifically includes a first setting module 211 and a second setting module 212.

The first setting module 211 is oriented to a developer and is used for being used by a developer, which is actually a setting interface provided for the developer, and is configured to set, in the display server 201, model types and template data corresponding to more than two network media information templates. The template data includes an element identification and model data. The model type sets the template model, for example, "sns_wide_pic_leftRight" indicates one model type, and represents a model type of "social network site-widescreen-having pictures-left-right structure". Each model type is corresponding to one or more preset basic network media information elements (briefly referred to as basic elements in this text). Each model type is further corresponding to one or more specific network media information templates. The network media information template corresponding to the model type includes all or a part of basic elements corresponding to the model type. In the display server 201, it is needed to set basic elements corresponding to each model type. A creation script required for creating basic elements has been set, when a developer sets, by using the first setting module 211, a random type of network media information template corresponding to a model type, the developer merely needs to select an identification of a basic element from the basic elements corresponding to the model type and input model data, without the need of writing a script for creating the selected element, thereby greatly reducing the workload of the developer. In this case, for several developers, identifications of basic elements corresponding to each model type are unified, and a basic element identification corresponds to a unique creation script for creating the basic element, thereby avoiding script difference when different developers develop element scripts, and facilitating direct teamwork of the different developers.

The second setting module 212 is oriented to a releaser user of network media information, specifically may be a front-end webpage service apparatus or client set on a server, and the releaser may access, by using a browser, the second setting module 212 to release network media information, or may also be a client. The second setting module 212 is configured to display, to the releaser of network media information, the network media information templates (that is, candidate network media information templates) set by the developer in the first setting module 211 for the releaser to select, and receive a selection instruction of the releaser and element content correspondingly input by the releaser, and generate corresponding network media information data and store the network media information data. The selection instruction indicates the network media information template selected from the candidate network media information templates. The network media information data includes a model type and template data corresponding to the network media information template selected by the releaser, and the element content input by the releaser. The template data includes an element identification and model data. The second setting module 212 generally has a setting interface, for example, three candidate network media information templates as shown in FIG. 1 may be displayed for the releaser to select, the releaser may select one of the network media information templates, and then a content setting interface of the selected network media information template may be displayed to the releaser. FIG. 3 is a schematic diagram of the content setting interface of the selected network media information template displayed to the releaser. Referring to FIG. 3, assuming that the user selects the network media information template "big picture network media information (wide version-top-down)" in FIG. 1, it is necessary to prompt the user to input element content of basic elements included by the network media information template in FIG. 3, for example, a title text 301, a material picture 302, a network media information jump link 303, and a more detailed template model option 304. In a specific implementation, after the releaser inputs the element content and the selection instruction, the releaser may click a "submit" button to send a submit request, and when receiving the submit request, the second setting module 212 may receive the selection instruction of the releaser and the element content correspondingly input by the releaser, and generate corresponding network media information data and store the network media information data.

In a specific implementation, if the network media information data further includes accumulated display effect data, the second setting module 212 needs to initialize the accumulated display effect data. The generated network media information data includes the initialized accumulated display effect data.

In a specific implementation, when the parsed element identification is the same as the element identification of the basic element, the parsed element identification is the same as and matches with the element identification of the basic element. The basic element is a basic element matching with the parsed element identification.

In a specific implementation, if the network media information data further includes the accumulated display effect data, the second setting module 212 accumulates display effect data sent by one or more user display apparatuses with the accumulated display effect data to obtain new accumulated display effect data, and updates the accumulated display effect data to the new accumulated display effect data.

In a specific implementation, the structural element is placed at a corresponding position in the network media information according to a position relationship between network media information elements corresponding to the structural element, so as to assemble into the network media information.

In a specific implementation, if the network media information data further includes accumulated display effect data, the structural element and the accumulated display effect data are assembled into the network media information.

In the embodiment of the present invention, at the server end, the developer merely needs to set template data, and in the display apparatus, it is needed to set an identification and a creation script of a basic element corresponding to each model type. After acquiring network media information data, the display apparatus may automatically create a basic element corresponding to the network media information model type according to a preset basic element creation script, find a structural element of the current network media information by matching according to an element identification in the template data, and then assemble, according to the model data, the structural element into network media information that needs to be displayed. Therefore, in the embodiment of the present invention, when developing a new network media information template, a developer of the network media information template does not need to frequently write and modify a large amount of scripts, and only needs to focus on writing of template data, without the need of concerning problems such as complicated network media information logic and script compatibility; therefore, the reusability of the script is high, and the extensibility of the network media information template is strong. In this case, by means of the embodiment of the present invention, it is unnecessary to release a new development script when launching network media information of a new model, and it is merely needed to add a new network media information template in the display server 201, the whole process has a simple operation and high efficiency, and risks caused by releasing the development script can also be avoided.

Figure 4:
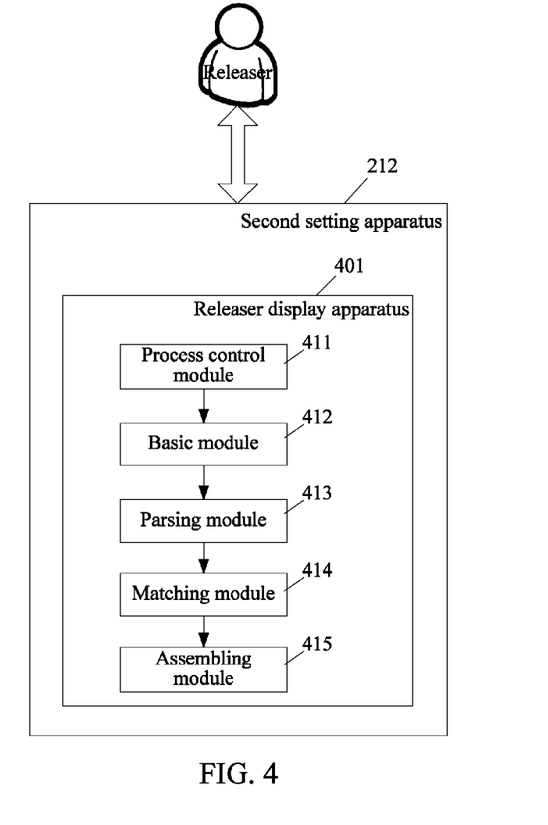
FIG. 4 is a schematic composition diagram of a releaser display apparatus in the second setting apparatus.

In an embodiment of the present invention, for the releaser of the network media information, a preview solution for the releaser may be further implemented. That is, the second setting apparatus 212 may further include a releaser display apparatus. FIG. 4 is a schematic composition diagram of the releaser display apparatus in the second setting apparatus 212, and referring to FIG. 4, the releaser display apparatus 401 includes the following modules.

A process control module 411 is configured to start a control preview process. Specifically, after the second setting apparatus 212 receives the selection instruction of the releaser and the element content correspondingly input by the releaser, if a preview instruction of the releaser is received, for example, in FIG. 3, the user clicks a "preview" button, the process control module 411 generates corresponding previewed network media information data, the previewed network media information data includes the model type and template data of the network media information template selected by the releaser and the element content input by the releaser, and the template data includes an element identification and model data.

In a specific implementation, content included in the previewed network media information data and the content included in the network media information data may be the same, both including the model type and the template data corresponding to the network media information template selected by the releaser and the element content input by the releaser. In this case, the process control module 411 may be configured to invoke the stored network media information data. The stored network media information data is used as the previewed network media information data.

In a specific embodiment, if the network media information data further includes accumulated display effect data, the generated previewed network media information data further includes preset accumulated display effect data.

A basic module 412 is configured to set the model type and one or more creation scripts of basic elements corresponding to the model type, respectively create one or more basic elements corresponding to the model type in the network media information data according to the one or more creation scripts after the process control module 411 generates the previewed network media information data, and add element content in the network media information data to a corresponding basic element.

In a specific implementation, the basic module 412 is configured to set one or more creation scripts according to one or more candidate model types and one or more candidate basic elements corresponding to the one or more candidate model types, where directed to each candidate creation script in the one or more candidate creation scripts, the candidate basic element corresponding to the candidate creation script is created, and the one or more basic elements are selected from the created one or more candidate basic elements.

A parsing module 413 is configured to parse the template data in the previewed network media information data to obtain an element identification and model data therein.

A matching module 414 is configured to extract, from the one or more basic elements that have been created by the basic module, a basic element matching with the parsed element identification, and use the extracted basic element as a structural element.

In an embodiment of the present invention, for the releaser of the network media information, a preview solution for the releaser may be further implemented. That is, the second setting module 212 may further include a releaser display apparatus. FIG. 4 is a schematic composition diagram of the releaser display apparatus in the second setting module 212, and referring to FIG. 4, the releaser display apparatus 401 includes the following modules.

A process control module 411 is configured to start a control preview process. Specifically, after the second setting module 212 receives the selection instruction of the releaser and the element content correspondingly input by the releaser, if a preview instruction of the releaser is received, for example, in FIG. 3, the user clicks a "preview" button, the process control module 411 generates corresponding previewed network media information data, the previewed network media information data includes the model type and template data of the network media information template selected by the releaser and the element content input by the releaser, and the template data includes an element identification and model data.

In a specific implementation, the structural element is placed at a corresponding position in the network media information according to a position relationship between network media information elements corresponding to the structural element, so as to form the network media information through assembling.

In a specific implementation, if the network media information data further includes accumulated display effect data, the structural element and the preset accumulated display effect data are assembled into the network media information.

In the releaser display apparatus 401 and the user display apparatus 202, except that process control modules have different display triggering times, other modules are the same or similar. By means of the above preview solution, after the releaser selects the network media information template and inputs the element content, the releaser may input a preview instruction, and the system may automatically present to the releaser a display effect of the network media information formed by the selected network media information template and the input element content, thereby improving the intuition and timeliness of releasing the network media information, facilitating the releaser to adjust a release solution in time according to the viewed release display effect, and reducing cost overhead caused by a wrong release.

Figure 5:
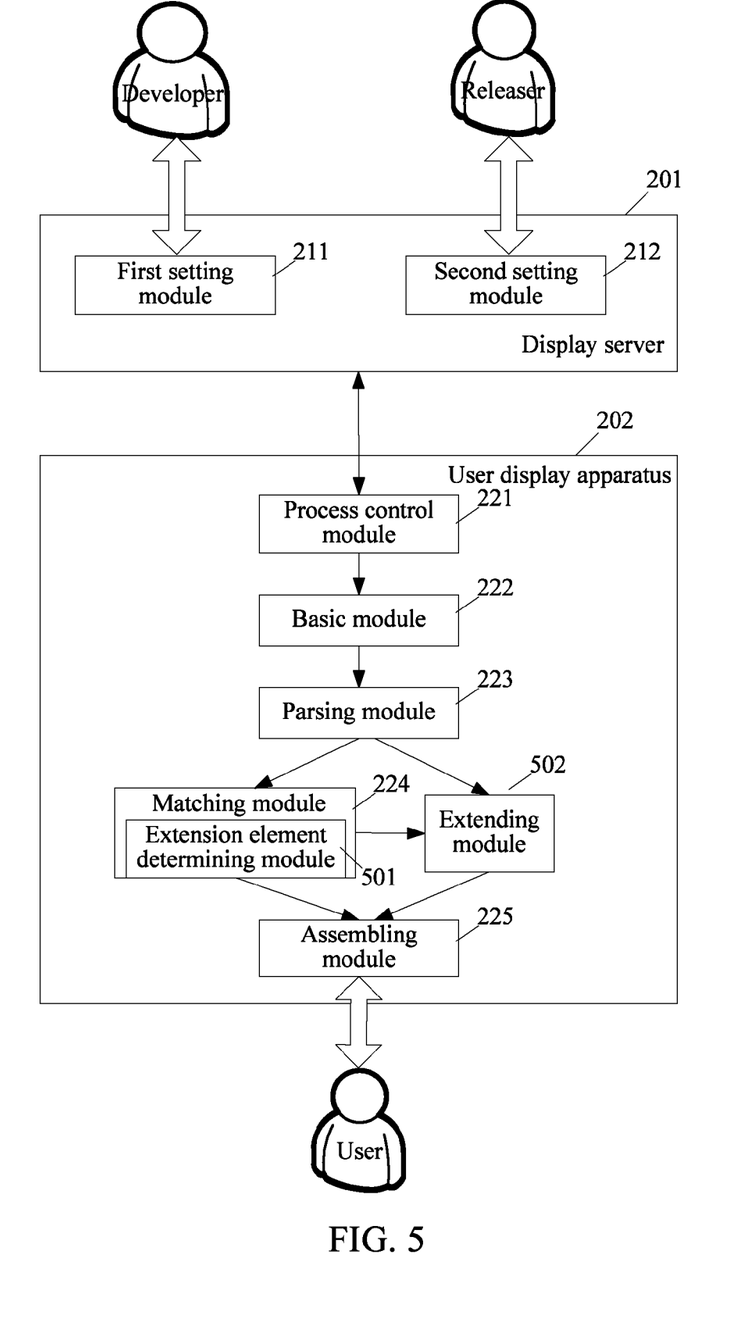
FIG. 5 is a schematic composition diagram of a user display apparatus including an extension element determining module and an extending module.

In order to further improve the extensibility of the network media information template, in an embodiment of the present invention, the template data may further includes one or more extension element identifications and corresponding creation expressions. When the developer sets the network media information template at the display server 201, the developer sets the extension element identification and the corresponding creation expression in the template data. Moreover, the user display apparatus 202 and the releaser display apparatus 401 may further include an extension element determining module and an extending module. FIG. 5 is a schematic composition diagram of the user display apparatus 202 including the extension element determining module and the extending module, the extension element determining module and the extending module in the releaser display apparatus are similar to those, and descriptions are made merely by using FIG. 5 as an example.

The extension element determining module 501 is set, for example, in the matching module as in this embodiment, and definitely can be set in the parsing module, and the extension element determining module 501 is configured to determining an element identification that cannot match with any basic element in the parsed element identification as an extension element identification.

Specifically, the extension element determining module 501 is configured to search the one or more extension element identification for an extension element identification the same as an element identification that cannot match with the basic element in the parsed element identification; create a corresponding extension element according to a creation expression corresponding to the found extension element identification, and add the corresponding element content in the network media information data in the corresponding extension element.

In a specific implementation, when the parsed element identification is different from an element identification of any basic element, the parsed element identification cannot match with any basic element.

The extending module 502 is configured to create a corresponding extension element according to a creation expression corresponding to the extension element identification, add the corresponding element content in the network media information data to the corresponding extension element, and use the extension element as a structural element. The extending module is provided with a recognition logic that can recognize the creation expression corresponding to the extension element, and the creation expression is executed by the recognition logic to create the corresponding extension element.

Moreover, the assembling module 225 is further configured to assemble the extracted structural element and the created extension element into the network media information according to the model data, and output and display the network media information.

By means of the solution in FIG. 5, when the developer sets the template data of the network media information template, if there is no extension element that the developer expects to extend in the basic element of a certain model type, the developer may add an extension element identification and a corresponding creation expression in the template data of the network media information template, so as to facilitate the developer to extend content of the network media information template very conveniently on the basis of the basic element, thereby further improving the extensibility of the network media information template.

In addition, in an embodiment, the process control modules in the user display apparatus 202 and the releaser display apparatus 401 may be further configured to set a reusable public function in the display apparatus, and when other modules in the display apparatus needs to execute an operation corresponding to the public function, invoke the corresponding public function in the process control module to perform the corresponding operation. The reusable public function is used to describe a basic framework of a programming language (for example, it is a javascript framework for a javascript language), and includes, for example, a document object module (DOM) operation, an event object, and a network media information display form corresponding to an event, and the like; the display apparatus may implement a corresponding operation according to the basic public functions.

For example, the process control module in the user display apparatus 202 and the releaser display apparatus 401 are each provided with a public function used to assemble into previewed network media information. When needing to execute an operation of assembling into previewed network media information, the assembling module 225 invokes the public function used to assemble into previewed network media information to execute the corresponding operation.

Figure 6:
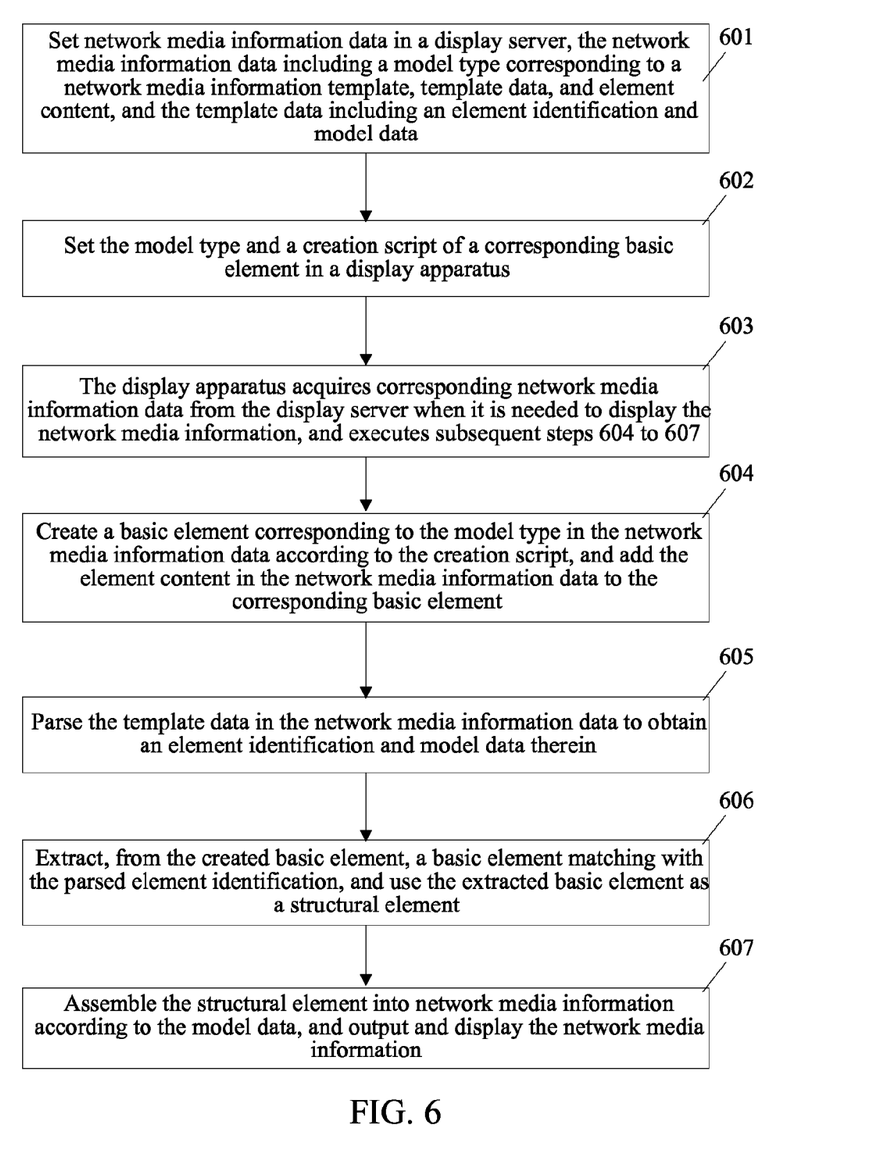
FIG. 6 is a flow chart of a network media information display method according to an embodiment of the present invention.

Corresponding to the above network media information display system, an embodiment of the present invention further discloses a network media information display method. FIG. 6 is a flow chart of the network media information display method. Referring to FIG. 6, the method includes:

Step 601: Set network media information data in a display server, the network media information data including a model type corresponding to a network media information template, template data, and element content, and the template data including an element identification and model data.

Step 602: Set the model type and one or more creation scripts of a corresponding basic element in a display apparatus.

In a specific implementation, one or more creation scripts are set according to one or more candidate model types and one or more candidate basic elements corresponding to the one or more candidate model types.

Step 603: The display apparatus acquires corresponding network media information data from the display server when it is needed to display the network media information, and executes subsequent steps 604 to 607. Specifically, the acquiring corresponding network media information data from the display server when it is needed to display the network media information may specifically include, for example: the display apparatus initiates a display request including a booth identification to the display server when it is needed to display the network media information, and after receiving the display request, the display server searches for network media information data corresponding to the booth identification, and returns the network media information data to the display apparatus.

Step 604: Create one or more basic elements corresponding to the model type in the network media information data according to the one or more creation scripts, and add the element content in the network media information data to the corresponding basic element.

In another specific implementation, directed to each candidate creation script in the one or more candidate creation scripts, the candidate basic element corresponding to the candidate creation script is created, and the one or more basic elements are selected from the created one or more candidate basic elements.

Step 605: Parse the template data in the network media information data to obtain an element identification and model data therein.

Step 606: Extract, from the created basic element, a basic element matching with the parsed element identification, and use the extracted basic element as a structural element.

In a specific implementation, when the parsed element identification is the same as the element identification of the basic element, the parsed element identification is the same as and matches with the element identification of the basic element. The basic element is a basic element matching with the parsed element identification.

Step 607: Assemble the structural element into network media information according to the model data, and output and display the network media information.

In a specific implementation, the structural element is placed at a corresponding position in the network media information according to a position relationship between network media information elements corresponding to the structural element, so as to form the network media information through assembling.

In the step 601, the setting network media information data in the display server specifically includes: setting model types corresponding to more than two network media information templates and template data, the template data including an element identification and model data; displaying the network media information templates (that is, the candidate network media information templates) to the releaser of the network media information for the releaser to select, for example, displaying interfaces as shown in FIG. 1 and FIG. 3 to the releaser for the releaser to select and input; and receiving a selection instruction of the releaser and element content correspondingly input by the releaser, generating network media information data and storing the network media information data, the network media information data including the model type corresponding to the network media information template selected by the releaser, the template data, and the element content input by the releaser, and the template data including the element identification and the model data.

In order that the releaser can preview a final display effect of the network media information formed by the selected network media information template and the element content, the method further sets the model type and the corresponding basic element in the releaser display apparatus; moreover, after the selection instruction of the releaser and the element content correspondingly input by the releaser are received, if a preview instruction of the releaser is received (for example, the releaser clicks the "preview" button in FIG. 3), the releaser display apparatus executes subsequent steps 611 to 615:

Step 611: Generate corresponding previewed network media information data, the previewed network media information data including a model type corresponding to the network media information template selected by the releaser, the template data, and the element content, and the template data including an element identification and model data.

Content included in the previewed network media information data and the content included in the network media information data may be the same, both including the model type corresponding to the network media information template selected by the releaser, the template data, and the element content input by the releaser.

Step 612: Create one or more basic elements corresponding to the model type in the previewed network media information data according to the one or more creation scripts, and add the element content in the previewed network media information data to the corresponding basic element.

In a specific implementation, one or more creation scripts are set according to one or more candidate model types and one or more candidate basic elements corresponding to the one or more candidate model types, where directed to each candidate creation script in the one or more candidate creation scripts, the candidate basic element corresponding to the candidate creation script is created, and the one or more basic elements are selected from the created one or more candidate basic elements.

Step 613: Parse the template data in the previewed network media information data to obtain an element identification and model data therein.

Step 614: Extract, from the one or more basic elements that have been created by the basic module, a basic element matching with the parsed element identification, and use the extracted basic element as a structural element.

Step 615: Assemble the structural element into the previewed network media information according to the model data, and output and display the previewed network media information to the releaser for preview.

In a specific implementation, the structural element is placed at a corresponding position in the network media information according to a position relationship between network media information elements corresponding to the structural element, so as to form the previewed network media information through assembling.

When the basic element corresponding to a model type does not include an information element of a network media information template which the developer expects to build, the developer may further write an extension element identification and a creation expression thereof into the template data, that is, the template data may further include one or more extension element identifications and corresponding creation expressions; and the method further includes: in step 606 and step 614, determining an element identification that cannot match with the basic element in the parsed element identification as an extension element identification; creating a corresponding extension element according to a creation expression corresponding to the extension element identification, adding the corresponding element content in the network media information data to the corresponding extension element, and using the extension element as a structural element; moreover, a specific method in step 607 and step 615 for assembling the structural element into the network media information according to the model data includes: assembling the extracted basic element and the created extension element into the network media information according to the model data. By means of processing the extension element, the present disclosure may further improve the extensibility of the network media information template.

In a specific implementation, in step 606 and step 614, the one or more extension element identification is searched for an extension element identification the same as an element identification that cannot match with the basic element in the parsed element identification; a corresponding extension element is created according to a creation expression corresponding to the found extension element identification, and the corresponding element content in the network media information data is added to the corresponding extension element.

The solution of the present invention is further described by using a specific example of network media information data as follows.

Figure 7:
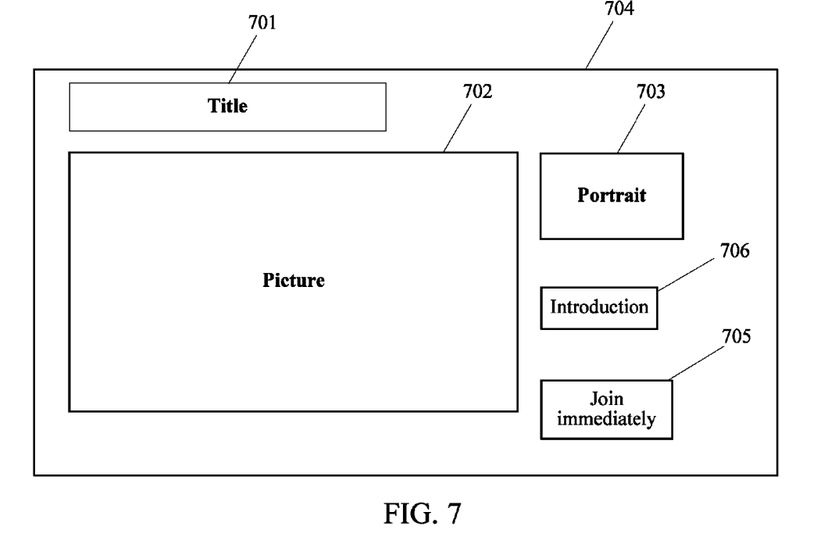
FIG. 7 is a schematic diagram of an interface of displayed specific network media information.

For example, after a user opens a certain webpage or client interface including a certain booth identification, it is needed to display network media information as shown in FIG. 7 to the user at the booth. The user display apparatus may initiate a display request including the booth identification to the display server, and assuming that the booth identification is weibo_SJ_WDZY_R2P_TJPP, and the sent display request is:

Uhttp://ls.l.qq.com/lview?c=t&loc=weibo_SJ_WDZY_R2P_TJPP&callback=cry stal.callbackarea&rot=1

After receiving the display request, the display server searches for corresponding network media information data submitted by the releaser according to the booth identification, and returns the network media information data to the user display apparatus. Assuming that the content of the network media information data is:

crystal.callbackarea([{ . . . "loc":"weibo_SJ_WDZY_R2P_TJPP","display":"sns_wi de_pic_leftRight", . . . , "mapData":{"$privacy": "1", "container": "body", "body": ["titleBlock", "adBlock"], "adBlock": ["imageBlock {'float':'left'}", "<div#1{'float':'right','width': '110px'}>"], "div#1": ["headiconBox", "textBox{'line-height':'20px'}", "<div#2{'position':'absolute','bottom': '5px'}>"], "div#2": ["joinBtn"], "textBox": ["textSpan1+adnumSpan", "textSpan2+userLink", "textSpan3+linkBtn"]},"fodder":[{"pic":"http://adsfile.qq.com/201211/02/bjjdsj_sa_201211023812.jpg","width":"182","height": "130","title":"2012 Year Aviation Technology Forum", "link_to": "http://c2.l.qq.com/lclick?seq=20121102001239&loc=weibo_SJ_WDZY_R2P_TJPP&soid=290DB90A0049509730CB85927900"}]}])

Where, "sns_wide_pic_leftRight" in the display attribute is a model type, and the basic module creates all basic elements, including a title 701 of the network media information, a material picture 702, a portrait 703, a frame 704 of the network media information, a "Join immediately" button 705, an introduction "Come and join us!" 706 of the network media information, and all other basic elements, corresponding to the model type according to creation codes corresponding to the model type, and add element content in the network media information data to the corresponding basic elements:

adding a title text "Year 2012 Aviation Technology Forum" to the title 701;

adding an access link of the material picture 702 pic": "http://adsfile.qq.com/201211/02/bjjdsj_sa_201211023812.jpg","width":"182" to the corresponding picture element to display the corresponding picture;

adding a jump address of the picture http://c2.l.qq.com/lclick?seq=20121102001239&loc=weibo_SJ_WDZY_R2P_TJPP&soid=290DB90A0049509730CB85927900 to a jump address element, such that a webpage jumps to the jump address after the user clicks the picture 702.

Content in the mapDate attribute is the template data, and the parsing module parses the template data to obtain the element identification and the model data therein, for example, "titleBlock" is an identification of a title element, "imageBlock" is an identification of a picture element, and the subsequent {'float':'left'} is the model data of the picture, and so on. The element identification includes an identification of the basic element, for example, identifications of elements 701 to 706, and also includes an identification of an extension element. For example, the identification of the extension element includes two elements "div#1" and "div#2", those following the extension element, including {'float':'right','width':'110px'}>"], "div#1": ["headiconBox", "textBox{'line-height':'20px'} and {'position':'absolute','bottom':'5px'}>"], "div#2": ["joinBtn"], "textBox":["textSpan1+adnumSpan", "textSpan2+userLink", "textSpan3+linkBtn"]} are a creation expression of the extension element.

The matching module extracts, from the basic element that has been created by the basic module, a basic element matching with an element identification in the mapDate attribute, and uses the extracted basic element as a structural element, that is, other basic elements except for the parsed element identification need to be filtered out, and merely the basic element corresponding to the parsed element identification is reserved, for example, the elements 701 to 706 are reserved. In addition, an element identification (that is, the "div#1" and "div#2") that cannot match with the basic element in the element identification it the mapDate attribute is determined as an extension element identification, and a corresponding extension element is created according to a creation expression corresponding to the extension element identification. If the network media information data further includes element content corresponding to the extension elements, the corresponding element content may be added to the corresponding extension element, and the extension element is used as a structural element. For example, "7379 people in total have joined us, Dear@Xingxuan" is the created extension element.

Finally, the assembling module assembles the extracted basic element and the created extension element into the final network media information shown in FIG. 7 according to the model data in the mapDate attribute, and outputs and displays the network media information to the user.

The embodiments described above are merely exemplary, for example, division of the modules is merely a division of logic functions, and in actual implementation, other division manners are available, for example, multiple modules may be integrated in one processing module, or various modules exist physically and separately.

Figure 8:
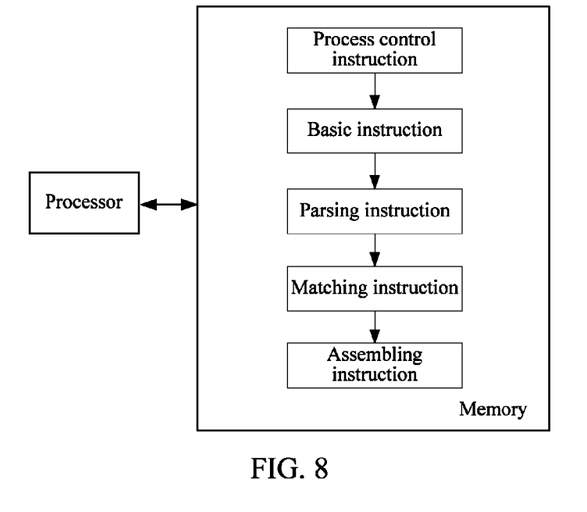
FIG. 8 is a schematic structural diagram of a user display apparatus for network media information according to an embodiment of the present invention.

FIG. 8 is a schematic structural diagram of a user display apparatus for network media information according to an embodiment of the present invention. The apparatus at least includes: a memory and a processor in communication with the memory, where the memory includes a process control instruction, a basic instruction, a parsing instruction, a matching instruction, and an assembling instruction that can be executed by the processor.

The process control instruction is used to acquire corresponding network media information data from a display server, the network media information data including a model type corresponding to a network media information template, template data, and element content, and the template data including an element identification and model data.

The basic instruction is used to create one or more basic elements corresponding to the model type.

The parsing instruction is used to parse the template data to obtain the element identification and the model data.

The matching instruction is used to extract, from the one or more basic elements created by the basic instruction, a basic element matching with the parsed element identification, use the extracted basic element as a structural element, and add the element content to the structural element.

The assembling instruction is used to assemble the structural element into network media information according to the model data, and output and display the network media information.

Figure 9:
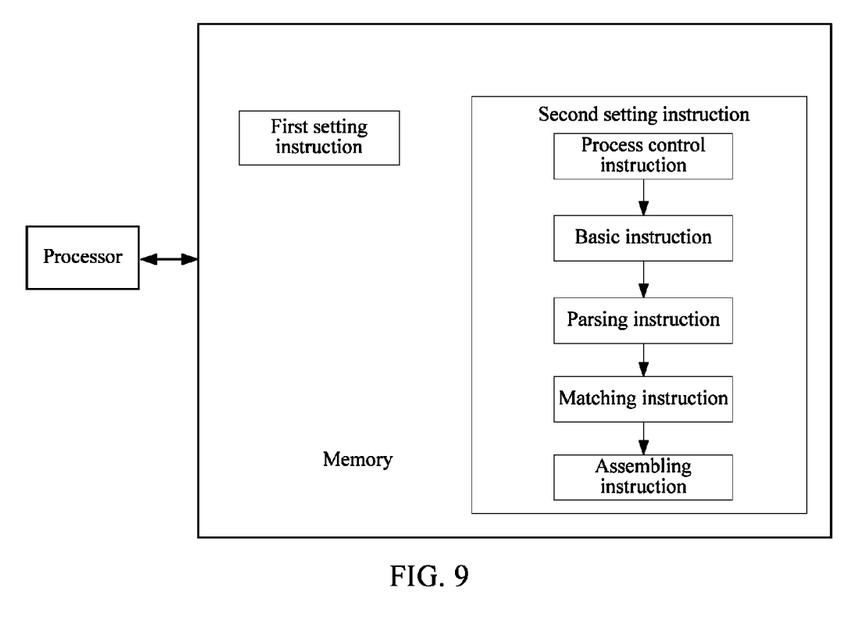
FIG. 9 is a schematic structural diagram of a display server for network media information according to an embodiment of the present invention.

FIG. 9 is a schematic structural diagram of a display server for network media information according to an embodiment of the present invention. The apparatus at least includes: a memory and a processor in communication with the memory, where the memory includes a first setting instruction and a second setting instruction that can be executed by the processor.

The first setting instruction is used to set, in a display server, a model type corresponding to one or more candidate network media information templates, and template data.

The second setting instruction is used to display the one or more candidate network media information templates to a user for the user to select, receive a selection instruction of the user and element content input by the user, generate network media information data and store the network media information data, the selection instruction instructing the user to select a network media information template from the candidate network media information template, the network media information data including the model type corresponding to the network media information template, the template data, and the element content input by the user, and the template data including an element identification and model data.

The above descriptions are embodiments of the present invention, and are not intended to limit the present disclosure. Any modification, equivalent replacement, improvement or the like made without departing from the spirit and principle of the present disclosure shall fall within the protection scope of the present disclosure.

What is claimed is:

1. A method for displaying network media information, the method comprising:
    acquiring, by a display apparatus, network media information data from a display server, wherein the network media information data comprises a model type corresponding to a network media information template, template data, and element content, and the template data comprises an element identification and model data, the element identification is an identification of an element of the network media information, and the model data is data used for describing a position relationship between a network media information element and other data for presenting a model;
    creating a basic element corresponding to the model type;
    parsing the template data to obtain the element identification and the model data;
    extracting, from the created basic element, a basic element matching with the parsed element identification, taking the extracted basic element as a structural element, and adding the element content to the structural element;
    assembling the structural element into network media information according to the model data, and outputting and displaying the network media information;
    wherein the template data further comprises an extension element identification and a corresponding creation expression;
    searching in the parsed element identification of the extension element identification for an element identification that cannot match with the basic element; and
    creating a corresponding extension element according to a creation expression corresponding to the extension element identification searched out, and adding the corresponding element content in the network media information data to the corresponding extension element; and
    assembling the structural element into the network media information comprises assembling the structural element and the extension element into the network media information according to the model data.

2. The method according to claim 1, wherein acquiring by the display apparatus corresponding network media information data from the display server comprises:
    sending, by the display apparatus, a display request comprising a booth identification to the display server; and
    receiving, by the display apparatus, the network media information data corresponding to the booth identification, which is searched out by the display server.

3. The method according to claim 1, wherein the network media information data further comprises accumulated display effect data; and
    assembling the structural element into the network media information comprises:
    assembling the structural element and the accumulated display effect data into the network media information.

4. A user apparatus for displaying network media information, comprising a memory and a processor communicating with the memory, the memory storing instructions that when executed by the processor cause the processor to:
    acquire corresponding network media information data from a display server, wherein the network media information data comprises a model type corresponding to a network media information template, template data, and element content, and the template data comprises an element identification and model data, the element identification is an identification of an element of the network media information, and the model data is data used for describing a position relationship between a network media information element and other data for presenting a model;
    create a basic element corresponding to the model type;
    parse the template data to obtain the element identification and the model data;
    extract, from the basic element created, a basic element matching with the parsed element identification, take the extracted basic element as a structural element, and add the element content to the structural element;
    assemble the structural element into network media information according to the model data, and output and display the network media information;
    search in the parsed element identification of the extension element identification for an extension element identification, which is the same as an element identification that cannot match with the basic element;
    create a corresponding extension element according to a creation expression corresponding to the extension element identification searched out, and add the corresponding element content in the network media information data to the corresponding extension element; and
    assemble the extracted structural element and the created extension element into the network media information according to the model data.

5. The user apparatus according to claim 4, wherein the instructions further cause the processor to:
    set a public function in the user apparatus; and
    invoke the public function corresponding to an operation to perform the operation, when it is needed to execute the operation.

6. A server for displaying network media information, comprising a memory and a processor communicating with the memory, the memory storing instructions that when executed by the processor cause the processor to:
    set a model type corresponding to a candidate network media information template, and template data;
    display the candidate network media information template to a user for the user to select, receive a selection instruction of the user and element content input by the user, generate and store network media information data, wherein the selection instruction instructs the user to select a network media information template from the candidate network media information template, the network media information data comprises the model type corresponding to the network media information template, the template data, and the element content input by the user, and the template data comprises an element identification and model data, the element identification is an identification of an element of the network media information, and the model data is data used for describing a position relationship between a network media information element and other data for presenting a model;

wherein the template data further comprises an extension element identification and a corresponding creation expression;

search in the parsed element identification of the extension element identification for an extension element identification, which is the same as an element identification that cannot match with the basic element;

create an extension element according to a creation expression, which corresponds to the extension element identification searched out, and add the element content to the corresponding extension element; and assemble the structural element and the created extension element into the network media information according to the model data.

7. The server according to claim 6, wherein the instructions further cause the processor to:
   invoke the stored network media information data, when receiving a preview instruction of a releaser;
   create a basic element corresponding to the model type, and add the element content to the basic element;
   parse the template data to obtain the element identification and the model data;
   extract, from the basic element that has been created, a basic element matching with the parsed element identification, and take the extracted basic element as a structural element; and
   assemble the structural element into network media information according to the model data, and output and display the network media information.

8. The server according to claim 6, wherein the instructions further cause the processor to:
   set a public function; and
   invoke the public function corresponding to an operation to perform the operation, when it is needed to execute the operation.

* * * * *